United States Patent
Walter et al.

(10) Patent No.: US 10,133,992 B2
(45) Date of Patent: Nov. 20, 2018

(54) SYSTEM AND METHOD FOR MONITORING MANUFACTURED PRE-PREPARED MEALS

(75) Inventors: Hubert Eric Walter, Ulm (DE);
Karl-Heinz Haas, Achtstetten (DE);
Roland Jans, Ulm (DE)

(73) Assignee: MGS MODULAR GALLEY SYSTEMS AG, Elchingen (DE)

( * ) Notice: Subject to any disclaimer, the term of this patent is extended or adjusted under 35 U.S.C. 154(b) by 1718 days.

(21) Appl. No.: 12/197,488

(22) Filed: Aug. 25, 2008

(65) Prior Publication Data
US 2009/0029014 A1    Jan. 29, 2009

Related U.S. Application Data

(63) Continuation-in-part of application No. 11/910,696, filed as application No. PCT/DE2006/000650 on Apr. 6, 2006, now abandoned.

(30) Foreign Application Priority Data

Apr. 7, 2005    (DE) .................. 10 2005 016 700

(51) Int. Cl.
*G06Q 10/06* (2012.01)
(52) U.S. Cl.
CPC .................... *G06Q 10/06* (2013.01)
(58) Field of Classification Search
CPC ............. F25D 2700/08; G06F 19/324; G06F 19/3475; G06K 17/00; G06K 19/00; G06K 2017/0045; G06K 2017/0087; H05B 1/0258; H05B 1/0261; H05B 1/0263; H05B 1/0266; H05B 2213/06; H05B 2213/07; H05B 6/12; H05B 6/1209; H05B 6/1218; H05B 6/1227; H05B 6/1236; H05B 6/1245; H05B 6/1254; H05B 6/1263; H05B 6/127; Y10S 707/99945; A47J 39/006; A23L 1/0107; A23L 1/0114; A23L 1/0121;
(Continued)

(56) References Cited

U.S. PATENT DOCUMENTS 3,275,393 A * 9/1966 Conklin et al. ................ 312/403
3,908,749 A * 9/1975 Williams .......................... 165/61
(Continued)

FOREIGN PATENT DOCUMENTS

JP        09018381 A  *  1/1997
JP     2002347944 A  * 12/2002
(Continued)

OTHER PUBLICATIONS

Machine Translation of JP2002-358591, published Dec. 13, 2002.*
(Continued)

*Primary Examiner* — Viren A Thakur
(74) *Attorney, Agent, or Firm* — Themis Law

(57) ABSTRACT

Described are a system and method for monitoring pre-prepared meals which can be assembled as a plurality of portions. Assembled pre-prepared meals can be monitored starting from their assembly up to the ultimate consumption. Pre-prepared meals are arranged on tray-like containers and a data carrier is fastened which contains meal-specific data. These meal-specific data can be read out at at least two reading stations to be able to keep a record of the conditions of manufacture, storage and/or cooling.

23 Claims, 2 Drawing Sheets

(58) Field of Classification Search
CPC ...... A23L 1/0128; A23L 1/0135; A23L 1/025; A23L 1/0252; A23L 1/0255; A23L 1/0257
USPC ................ 426/520, 132; 340/12.51; 219/627
See application file for complete search history.

(56) References Cited

U.S. PATENT DOCUMENTS

| | | | | |
|---|---|---|---|---|
| 4,093,041 | A * | 6/1978 | Davis et al. ..................... | 186/45 |
| 4,110,587 | A * | 8/1978 | Souder et al. ................. | 219/622 |
| 4,225,204 | A * | 9/1980 | Bellavoine ............. | A47B 31/02 165/58 |
| 4,323,110 | A * | 4/1982 | Rubbright et al. .......... | 165/267 |
| 4,884,626 | A * | 12/1989 | Filipowski .................... | 165/231 |
| 5,285,041 | A * | 2/1994 | Wright ......................... | 219/717 |
| 5,466,915 | A * | 11/1995 | Meier .................. | A47J 39/006 219/621 |
| 5,719,586 | A * | 2/1998 | Tuttle ........................... | 343/726 |
| 5,798,694 | A * | 8/1998 | Reber et al. .................. | 340/540 |
| 6,097,014 | A * | 8/2000 | Kirsch ......................... | 219/621 |
| 6,316,753 | B2 * | 11/2001 | Clothier et al. ............. | 219/621 |
| 6,359,268 | B1 * | 3/2002 | Walter ......................... | 219/622 |
| 6,433,313 | B1 * | 8/2002 | Owens et al. ................ | 219/387 |
| 6,445,976 | B1 | 9/2002 | Ostro | |
| 6,480,699 | B1 * | 11/2002 | Lovoi .......................... | 455/41.2 |
| 6,539,846 | B2 * | 4/2003 | Citterio et al. ................ | 99/468 |
| 6,856,932 | B1 * | 2/2005 | Wallace ....................... | 702/130 |
| 7,615,727 | B2 | 11/2009 | Walter | |
| 2002/0059175 | A1 * | 5/2002 | Nakano ............................ | 707/1 |
| 2003/0006281 | A1 * | 1/2003 | Thomas et al. ................ | 235/385 |
| 2004/0004073 | A1 * | 1/2004 | Clothier ........................ | 219/620 |
| 2004/0069155 | A1 * | 4/2004 | Shei ................................ | 99/448 |
| 2004/0149736 | A1 * | 8/2004 | Clothier ........................ | 219/627 |
| 2005/0046584 | A1 * | 3/2005 | Breed ..................... | 340/825.72 |
| 2007/0144202 | A1 * | 6/2007 | Theodos et al. ................ | 62/348 |
| 2007/0254079 | A1 * | 11/2007 | Sus et al. ...................... | 426/523 |
| 2009/0040045 | A1 * | 2/2009 | Walter et al. ................. | 340/540 |

FOREIGN PATENT DOCUMENTS

| | | | | |
|---|---|---|---|---|
| JP | 2002358591 | A | 12/2002 | |
| JP | 2003267555 | A | 9/2003 | |
| WO | 03/005295 | A1 | 1/2003 | |
| WO | WO 03005295 | A1 * | 1/2003 | |
| WO | WO 2004075703 | A1 * | 9/2004 | |
| WO | WO 2005006239 | A1 * | 1/2005 | ............ G06F 19/00 |
| WO | WO 2006105784 | A2 * | 10/2006 | |

OTHER PUBLICATIONS

Machine Translation of JP2002-347944, published Dec. 2002.*
Machine Translation of JP2003-267555, published Sep. 2003.*
Formal Translation of JP2002-358591 to Matsuzaka et al.*

* cited by examiner

SYSTEM AND METHOD FOR MONITORING MANUFACTURED PRE-PREPARED MEALS

RELATED APPLICATIONS

This application is a continuation-in-part of U.S. application Ser. No. 11/910,696 filed Oct. 4, 2007 now abandoned which claimed the benefit of German Patent Application Serial No. DE 10 2005 016 700.4 filed Apr. 7, 2005 and to PCT Patent Application Serial No. PCT/DE2006/000650 filed Apr. 6, 2006. The specifications of these applications are expressly incorporated herein by reference in their entirety to form part of the present disclosure.

FIELD OF THE INVENTION

The invention relates to a system and to a method for monitoring pre-prepared meals which can be assembled as a plurality of portions.

BACKGROUND OF THE INVENTION

In this context, the assembly takes place by means of tray-like containers (shelves) in which containers containing pre-prepared meals can be arranged in a locally defined manner and, where possible, can also be fixed against sliding by a corresponding design of the respective tray-like containers, which can be achieved by corresponding receivers for containers with meals on tray-like containers. However, similar containers can also be used, for example those which can also be closed by covers. A wireless and contactless transmission of information from, and optionally also to, data carriers should, however, remain ensured in this context. Further goods from the catering sector can also be present in addition to meals and beverages.

Such a tray-like member element can be equipped solely for the assembly with containers containing meals which subsequently have to be heated before consumption. However, there is also the possibility to position containers with meals which can also be consumed cold on tray-like containers and, optionally, to include other articles or also beverages in such a tray-like container.

The assembly of the different meals and, optionally, also beverages usually takes place in centralized fashion at one position and subsequently a storage takes place and a transport, via a transport chain which can also be interrupted, up to the consumer.

Use is in particular provided for the provision of foodstuffs and beverages for consumption in means of transportation, very specifically preferably in aircraft.

However, problems occur in the known solutions since it is not possible, or is only insufficiently possible to achieve a record of the observation of a cold chain, the respective best-before date by which the meals may be consumed and also a record on the supply of the assembly from the caterer to the consumer.

Incorrect deliveries can thereby not be recognized or only recognized with an increased effort.

The observation of a set cold chain is moreover not possible and there is moreover the risk that meals correspondingly assembled in this way will be consumed after the expiry of their shelf life and an impairment of the health of corresponding consumers can thus occur.

SUMMARY OF THE INVENTION

The present invention relates to a system with which correspondingly assembled pre-prepared means can be monitored starting from their assembly up to the ultimate consumption.

For this purpose, a data carrier should be attached to a tray-like container. In this connection, such a data carrier can be attached directly to the tray-like container, but also to at least one container for meals or beverages which is in turn received and held by means of a tray-shaped container. Similarly designed containers, for example box-shaped, can also be used.

Such a data carrier should be suitable to be able to read out the respective data.

The data should be able to be read out at at least one reading station, preferably two reading stations. The reading stations can also be designed such that in addition a transmission of data to the data carrier, that is a reading or a writing of data, is possible.

The data stored on the data carrier can be the respective date of manufacture, assembly and/or of maximum shelf life. In addition, data on the quantity, mass or number can also be utilized. The maximum shelf life date should, however, mean the shelf life date of a meal or also of a beverage on a tray-like container having the shortest shelf life period.

Those data carriers are preferred which can store the corresponding data in electronic form and which can be read out in contactless manner by means of electromagnetic waves, which is e.g. possible with RFID technology known per se. In this case, a semiconductor circuit member with an antenna on a carrier suitable for the transmission of data is suitable. The reading out can take place over a distance of some centimeters up to several meters using suitable systems which likewise have an antenna. The transmission of the data takes place substantially inductively and/or capacitively, with the possibility also being able to be given in this case of subsequently storing corresponding data on such a data carrier.

This is e.g. advantageous when corresponding recording data should be stored during transportation and storage.

Corresponding data on the entry into a storage depot, a cooling depot, the placing into a meal trolley can thus be stored.

This relates to the respective location and in the case of a cooling the respective times and storage temperatures can additionally be input. Data can be temporarily stored at the respective locations at which a reading of data from data carriers takes place and can subsequently or, optionally, simultaneously or in real time or almost real time be transmitted to a central data processing unit with which a monitoring of the respective logistics takes place.

For an uninterrupted monitoring of a set cooling chain to be observed, an additional temperature sensor can be used with the data carrier which transmits corresponding measured temperature signals to the data carrier as additional information continuously or also sequentially in specific settable time cycles. In this case, an additional element for the storage of electrical energy should be present which can advantageously be charged again or also rechargeable, with such charge procedures of such an electrical energy storage element being able to take place, where possible, in a wireless and contactless fashion in an inductive or capacitive manner.

Furthermore, other characteristic additional data can also be stored on a data carrier which can be utilized for the control of a unit for heating on the heating of corresponding meals. For example, different meals thus correspondingly require different heating conditions, which substantially relates to the respective temperatures, heating rates and the maximum heating time. In addition, data can be stored in the data carrier which reproduce the respective position of meals to be heated and of meals or beverages not to be heated on a tray-like container so that when an assembled tray-like container is introduced into an oven unit in which an inductive heating is preferably to be carried out, the heating then only takes place locally specifically at locations at which meals to be heated are positioned.

Furthermore, at least one reading unit for corresponding data should also be present at such a unit/oven for the heating of meals and is then connected to the control of this unit/oven.

A possibility should advantageously be provided with which a warning signal is generated on a read-out of data which may occur, said data signaling the expiry of a maximum shelf life of meals or beverages and said warning signal then displaying this data visually and/or acoustically and warning the operator. A datum recognized in this matter can, however, also be evaluated in this manner and transmitted to the control of the unit/oven so that no heating of meals can take place in such a unit/oven after the expiry of the shelf life and a health risk can be prevented with almost 100% security.

The already mentioned reading and/or transmitting units for data of the data carriers can be arranged at respective gates through which the assembled meals and beverages can be introduced to and removed from storage and transportation units. This relates to gates or supply entrances of storage and cooling depots. Corresponding reading and transmitting units for the data can also be present on means of transportation such as trucks or rail vehicles on the respective doors or gates. The electrical energy supply for the reading and/or transmitting units is possible without problem at such locations as a rule.

With mobile meal trolleys such as are frequently used in aircraft, however, corresponding reading and/or transmitting units for data should likewise preferably be attached in the region or proximity of doors. Such meal trolleys usually do not have their own electrical energy storage or connections for electrical energy. The latter are also frequently unfavorable since an electrical energy supply via leads is unfavorable in the utilization of meal transportation means.

Electrical energy storage elements can therefore be attached to the meal trolleys which can be charged inductively and/or capacitively, which is possible at corresponding charging stations. For this purpose, the meal trolleys only have to be positioned accordingly so that a contactless electrical energy transmission can take place inductively and/or capacitively on a correspondingly designed electrical energy store. Corresponding charge stations can be present at specific central points, also inside means of transportation, e.g. aircraft, so that a corresponding meal trolley only has to be positioned at a sufficient distance from such a charge station. It can then be used in a mobile manner with a charged electrical energy store.

An additional, readable intermediate store for data can be present on a meal trolley equipped in this manner and its intermediately stored data can be read out via optionally present connections and transmitted, as already discussed above, to a central data processing unit. The read-out of data of such an intermediate store can likewise take place in a wireless manner via RFID technology.

Correspondingly suitable possibilities for the formation of corresponding antennas, data stores and electrical energy stores can thus also be retrofitted to meal trolleys. Coils can thus be installed at the housing of meal trolleys, for example, with corresponding joints preferably being cut out into which the individual windings of coils can be laid.

Such antennas should be present on the outer walls or also on all doors of meal trolleys since they can as a rule be applied on both sides and a removal is also possible from both sides.

Electronic display elements (displays) can also be installed at meal trolleys so that data on the contents can be obtained easily from the outside. The respectively displayed data can also be directly selected in this context, which is e.g. possible via an electronic unit with an input option via a keyboard or by means of touch screen technology. The respective destination can thus be visibly displayed from the outside on a corresponding selection. Display elements can be used which are also able to continue to display the data without a further connection or after a deactivation of electrical energy.

Receiving and transmitting elements such as already discussed above can, however, also be present in storage containers inside kitchens (galleys). The aforesaid statements on a possible intermediate storage and transmission of corresponding data to a central data processing unit also apply here. An almost uninterrupted recording of the storage and transportation up to consumption can thus be made via the locally detected and read out data, with a record of the observation of a cooling chain also being possible in a preferred embodiment.

In addition, the corresponding identification data for the respective meal trolley can also be stored on meal trolleys so that there is at least a record with which the last detected location of the respective meal trolley is possible.

The system in accordance with the invention moreover simplifies the effort for inventories and for accounting, with the latter also applying to specific articles which do not necessarily have to be meals or beverages, but also articles sold inside means of transportation, for example duty free articles.

The system in accordance with the invention can not only be advantageously used for the catering for passengers in means of transportation, but also in other areas such as is the case in clinics or in large catering companies.

A complex monitoring of the most varied elements used, such as the assembled containers and meal trolleys with contents and respective location can take place with systems in accordance with the invention, with the latter applying at least to the location at which corresponding data were last read out from data carriers. In this context, the content data can also be utilized to obtain and process findings on the respective contents electronically, that is without any additional written documentation. This e.g. relates to the reordering or also to the accounting of used or sold articles so that differences can be avoided in accounting or also in inventories and the administration effort can be reduced.

If such data are read out in a mobile means of transportation such as a rail vehicle or an aircraft, they can also be transmitted in a wireless manner by means of transmitting and receiving systems known per se, for example as GMS or UMTS signals, and can be supplied to a central data processing unit so that a real-time monitoring and control is thereby also possible.

With meals and beverages, an electronic detection, further processing and evaluation of HACCP data according to ISO 9000 can take place with the system in accordance with the invention so that paperless work is possible.

A storage and evaluation of detected information from data carriers can naturally not only take place at the central data processing unit already mentioned a plurality of time, but also at interposed data processing units alone or additionally.

The corresponding antennas or receivers for the detection of data transmitted wirelessly can be designed at the stations for the reading of data from the respective data carriers transmitted by means of electromagnetic waves, e.g. using RFID technology, such that the data carriers can be moved through the respective windings of corresponding coils and such that at least the reading out of data can be achieved, but preferably also the transmission of additional new information.

These data carriers, which can be operated in RFID technology, can, for example, be so-called "smart labels" in label form which can be fastened to the pre-assembled tray-like container relatively simply via an adhesive film. Operation can take place at a standardized transmission frequency for data, for example 13.56 MHz.

Specific data can then be stored at the place of assembly, which in particular applies to the identification data for an assembled tray-like or similarly made container.

Such a data carrier can be attached to the tray-like container at a protected location so that it is protected as much as possible from mechanical damage. The fastening of such data carriers, and also the writing of the respective data, can take place in automated fashion so that the costs can also hereby be reduced and errors prevented.

A plurality of antennas for the transmission of data can be present at reading and/or transmitting units for data and preferably realize the data transmission and storage via multiplexes. In this context, the antennas can also be configured for the different frequencies which are used for the transmission of data from and also to data carriers so that the different transmission systems can be taken into account.

DETAILED DESCRIPTION OF THE INVENTION

Figure 1:
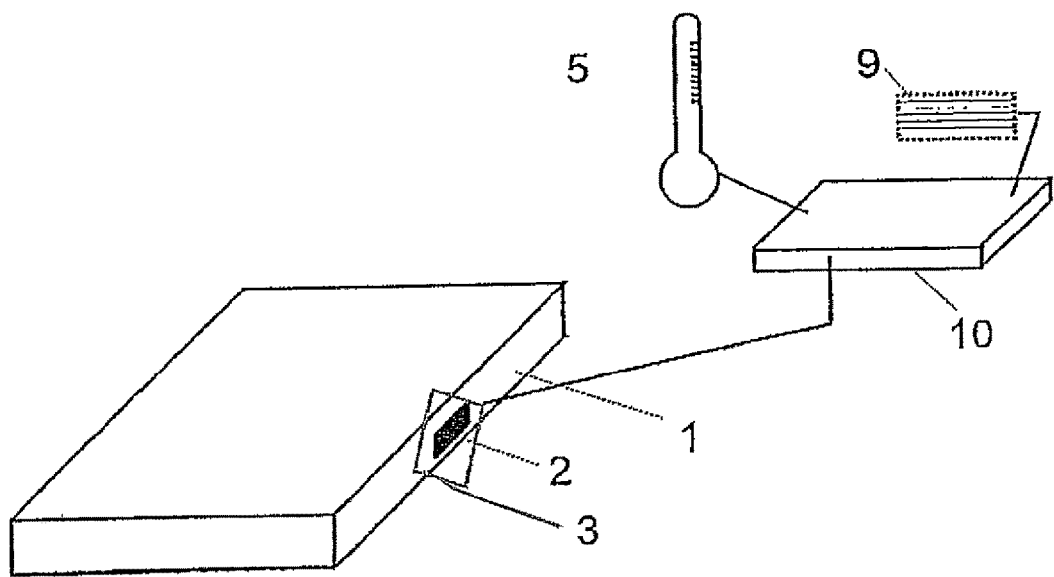
FIG. 1 is a schematic diagram illustrating a preferred embodiment of the invention.

FIG. 1 shows the tray-like container 1 which is provided with the data carrier 2. In this case, the data carrier 2 can be read from or else written to using the reading unit 3; for this purpose, the reading unit 3 is connected to the control unit 10 which, for its part, has the electronic display 9 and the temperature sensor 5. The arrangement illustrated in FIG. 1 makes it possible to output plain text details of the contents of the tray-like container 1.

Figure 2:
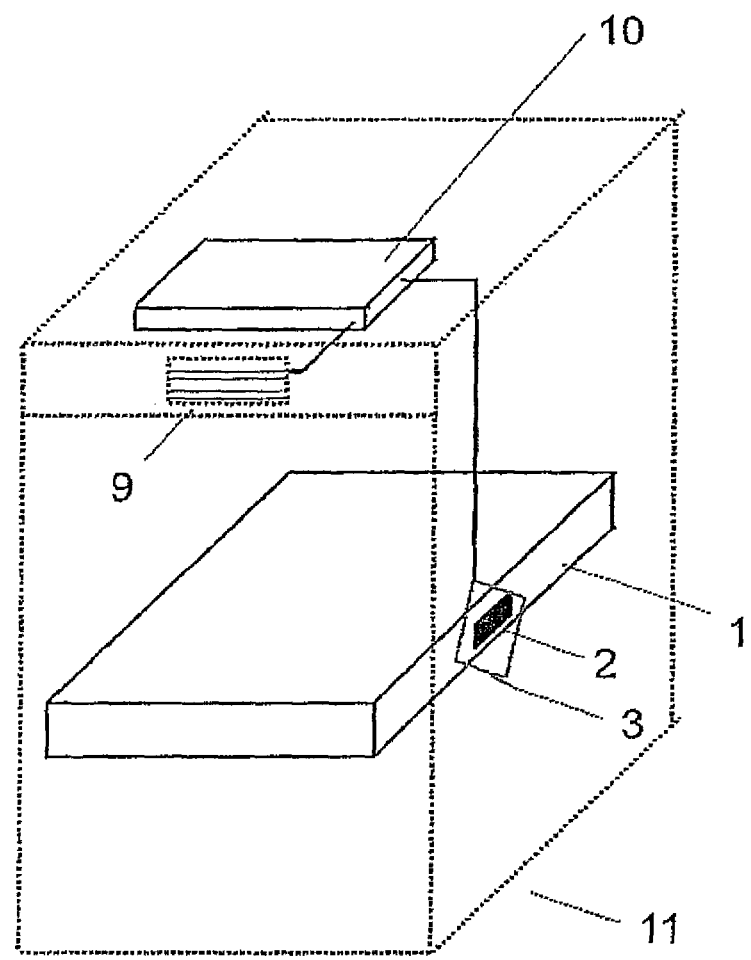
FIG. 2 is a schematic diagram of an alternative embodiment showing a tray-like container disposed in a heating unit which incorporates a control unit.

FIG. 2 shows the tray-like container 1 with the data carrier 2 in a heating unit 11. In this case, the control unit 10 is designed as part of the heating unit 11, like the electronic display 9 and the reading unit 3. In this case too, plain text details of the contents of the tray-like container 1 can be output via the electronic display 9. In addition, the data carrier 2 can be used, in collaboration with the control unit 10 and the reading unit 3, to select a heating program for the heating unit 11 using the contents which have been read from the data carrier 2 and thus to preset the heating unit. In addition, it is conceivable to also transmit complete heating programs for the heating unit 11 via the data carrier and the control unit in collaboration with the reading unit 3.

The unique RFID identification number on the data carrier 2, which is assigned to each packaging unit of food, makes it possible to avoid food being heated twice. This can be achieved by virtue of the fact that, in the case of food which is heated on an outbound flight and is not used, renewed—undesirable—heating on the return flight is prevented either by the heating unit 11 writing an "already heated" flag to the data carrier 2 or by storing the identification numbers of the food which has already been heated in a stack.

Temperature data can be stored on the data carrier 2. This may be effected during storage on ground using special control units with a temperature sensor or on board using the control units 10 of the heating units 11.

The stored temperature data can then be used to log the food and monitor it in accordance with HACCP. For example, the control unit on ground can store the information stating that the temperature of 4° C. has not been exceeded during storage on the data carrier 2; alternatively or additionally, the control unit 10 of the heating unit 11 can store the fact that the food has been heated properly using the heating program 1 on the data carrier 2.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for monitoring assembled pre-prepared meals which are arranged on a shelf such that the shelf supports both a meal to be heated and a meal or beverage not to be heated on said shelf, said method comprising the steps of:
   (a) automatically storing meal-specific data on a data carrier which is coupled to the shelf;
   (b) automatically reading out said data from said data carrier at at least one reading station; and
   (c) heating the meal to be heated by controlling a device for heating the meal to be heated using said data stored on said data carrier and read out in a contactless manner, wherein said data carrier is configured for storage of data and for reading out of data at the at least one reading station, as well as the writing of data to the data carrier when the shelf is in a transport mode, said data comprising data on heating conditions and the respective position of the meal to be heated and of the meal or beverage not to be heated that are supported on the shelf, said heating device being controlled such that said heating device carries out heating only locally in a selective manner at a location of said shelf at which the meal to be heated is located and does not carry out heating at a location of said shelf at which the meal not to be heated or the beverage not to be heated is located, said meal specific data including data indicative of expiry of a maximum shelf life, said device further being controlled based on said meal specific data such that no heating of a meal can take place in said device after the expiry of the shelf life of the meal, and
   wherein said method for monitoring further includes:
   (i) automatically recording data at the reading station or at a central data processing unit on when the meal has been heated, such to update information by the reading station or at the central data processing unit as to which meals have already been heated, and (ii) preventing any reheating of a previously heated meal, with updated status, while supported on the shelf.

2. A method in accordance with claim 1, wherein the step of automatically recording data comprises including an "already heated" record on the data carrier which is coupled to the shelf.

3. A method in accordance with claim 1, wherein said meal-specific data is stored in a wireless and contactless manner.

4. A method in accordance with claim 2, further comprising the steps of measuring temperature signals during said transportation and storage and storing said temperature signals as data on said data carrier.

5. A method in accordance with claim 1, further comprising the step of generating a warning signal in response to a recognition of an expiry of a maximum shelf life of a meal or beverage supported on the shelf.

6. A method in accordance with claim 1, wherein a wireless data transmission is carried out during the transportation in mobile means of transportation to a central reception system.

7. A method in accordance with claim 1, further comprising the step of transmitting said meal-specific data to and/or from said data carrier, said transmitting being carried out inductively or capacitively.

8. A method in accordance with claim 1, wherein said meal-specific data stored on said data carrier is made visually detectable from the outside on electronic display elements located on a meal trolley in which meals or a meal and a beverage arranged on the shelf are contained.

9. A method in accordance with claim 8, wherein said meal-specific data are displayed on said electronic display elements in plain text form.

10. A method in accordance with claim 8, wherein said meal-specific data are also displayed on display elements after deactivation of electrical energy.

11. A method in accordance with claim 1, wherein a multiplex data transmission and storage is realized at reading and/or transmitting units having a plurality of antennas for data.

12. A method for monitoring a pre-prepared meal assembly arranged on a shelf such that the shelf supports both a meal to be heated and a meal or a beverage not to be heated on said shelf, said method including:
 (a) automatically storing meal-specific data on a data carrier which is coupled to the shelf;
 (b) automatically reading out said data from said data carrier at at least one reading station; and
 (c) heating the meal to be heated by controlling a device for heating the meal to be heated using said data stored on said data carrier and read out in a contactless manner, said data comprising data relating to heating conditions and the respective positions of the meal to be heated and of the meal or beverage not to be heated on the shelf, said heating device being controlled such that said heating device carries out heating only locally in a selective manner at a location of said shelf at which the meal to be heated is located and does not carry out heating at a location of said shelf at which is located the meal or the beverage not to be heated; and
 (d) wherein said method further includes heating a plurality of said shelves each supporting a meal to be heated and a meal or beverage not to be heated, and said plurality of said shelves being positioned in a stack within a meal trolley positioned on a mobile means of transportation on which consumers of the pre-prepared meals are located; and
 wherein, following heating;
 (i) the data carrier of a respective, heated shelf is automatically adjusted to reflect an "already heated" state relative to a heated meal in the stack of container shelves in the meal trolley during transport on the mobile means of transportation; or
 (ii) a step of identifying with identification information the meal that went from a to-be-heated to a "already heated" state in the stack is carried out during transportation on the mobile means of transportation, and
 (e) wherein the method further comprising preventing any heating of the already heated meal, while the already heated meal is supported on the shelf, based on an identification that the meal has achieved the "already heated" state.

13. The method of claim 12 wherein said meal trolley includes a display designation as to when there exists an "already heated" state for a specific heated meal in the shelf that has been heated with the heating device.

14. The method of claim 13 wherein the mobile means of transportation is one of an aircraft or rail vehicle, and heating is carried out during a first leg of travel and a writing of the "already heated" state to the data carrier avoids a re-heating on a subsequent, second leg of travel.

15. The method of claim 12 wherein the mobile means of transportation is one of an aircraft or rail vehicle, and heating is carried out during a first leg of travel and a writing of the "already heated" state to the data carrier avoids a re-heating on a subsequent, second leg of travel.

16. The method of claim 12 wherein there are plurality of meal trolleys on said mobile means of transportation, and wherein there is provided on said mobile means of transportation a galley, with said galley having a receiving and transmitting element as well as an intermediate data storage unit which stores data read relative to the shelves in said stacks of shelves stored in the meal trolleys.

17. The method of claim 16 wherein said intermediate data storage unit is positioned on said mobile means of transportation and is in wireless communication with a central data storage unit positioned at a location removed from said intermediate data storage unit.

18. The method of claim 16 wherein a storage device of a storage container of said galley also stores identification data for the respective meal trolleys.

19. The method of claim 12 wherein said meal trolley comprises two sides and said data carriers coupled to the shelves are configured to monitor for removal of a shelf through either of the two sides.

20. The method of claim 12 wherein said shelf includes a separate meal or beverage container supported on said shelf adjacent to a supported meal or beverage container also being supported by the shelf.

21. The method of claim 12 wherein the shelf is an aircraft food supply shelf.

22. The method of claim 12 comprising utilization of method step d(i).

23. The method of claim 12 comprising utilization of method step d(ii).

* * * * *